United States Patent
Pons et al.

(10) Patent No.: US 8,112,687 B2
(45) Date of Patent: Feb. 7, 2012

(54) SYSTEMS AND METHODS FOR MITIGATING IMPULSE NOISE

(75) Inventors: Julien D. Pons, Carteret, NJ (US);
Patrick Duvaut, Tinton Falls, NJ (US);
Massimo Sobara, Freehold, NJ (US);
Yue-Peng Zheng, Marlboro, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 435 days.

(21) Appl. No.: 12/348,763

(22) Filed: Jan. 5, 2009

(65) Prior Publication Data

US 2009/0177938 A1 Jul. 9, 2009

Related U.S. Application Data

(60) Provisional application No. 61/018,887, filed on Jan. 3, 2008.

(51) Int. Cl.
*H04L 1/18* (2006.01)
(52) U.S. Cl. ........................ 714/748; 375/224
(58) Field of Classification Search .............. 714/748; 375/224
See application file for complete search history.

(56) References Cited

U.S. PATENT DOCUMENTS

| | | | |
|---|---|---|---|
| 7,003,710 B2 * | 2/2006 | Tomaru et al. | 714/751 |
| 7,143,330 B2 * | 11/2006 | Ahn et al. | 714/748 |
| 7,366,132 B2 * | 4/2008 | Ramakrishnan et al. | 370/328 |
| 7,600,173 B2 * | 10/2009 | Matsumoto | 714/755 |
| 7,653,856 B2 * | 1/2010 | Ahn et al. | 714/748 |
| 7,810,007 B2 * | 10/2010 | Herrmann | 714/746 |
| 7,864,745 B2 * | 1/2011 | Cai et al. | 370/343 |
| 7,889,654 B2 * | 2/2011 | Ramakrishnan et al. | 370/231 |
| 7,889,696 B2 * | 2/2011 | Choi et al. | 370/330 |
| 2006/0056305 A1 | 3/2006 | Oksman et al. | |
| 2006/0078044 A1 | 4/2006 | Norrell et al. | |
| 2006/0107174 A1 | 5/2006 | Heise | |
| 2006/0133355 A1 | 6/2006 | Anschutz | |
| 2008/0062872 A1 * | 3/2008 | Christiaens et al. | 370/231 |
| 2008/0063007 A1 * | 3/2008 | Christiaens et al. | 370/458 |
| 2008/0248758 A1 | 10/2008 | Schedelbeck et al. | |

OTHER PUBLICATIONS

PCT International Search Report and Written Opinion in co-pending, related PCT Application No. PCT/US2009/30108, dated Mar. 6, 2009.

* cited by examiner

*Primary Examiner* — Esaw Abraham
(74) *Attorney, Agent, or Firm* — Pillsbury Winthrop Shaw Pittman LLP

(57) ABSTRACT

Various embodiments for mitigating impulse noise are disclosed that cooperatively use impulse noise statistics to utilize retransmission, forward error correction (FEC), and blanking to mitigate the effects of a wide variety of impulse noise sources.

11 Claims, 15 Drawing Sheets

SYSTEMS AND METHODS FOR MITIGATING IMPULSE NOISE

CROSS-REFERENCE TO RELATED APPLICATION

Under 35 U.S.C. 119, this application claims priority to, and the benefit of, U.S. Provisional Patent Application entitled, "Cognitive and Universal Impulse Noise Protection," having Ser. No. 61/018,887, filed on Jan. 3, 2008, which is incorporated by reference in its entirety.

BACKGROUND OF THE INVENTION

1. Field of the Invention

The present invention relates to the deployment of Video on Digital Subscriber Lines (DSL) and specifically to significantly improve the protection of DSL systems against a wide variety of impulse noises experienced in the field, in order to maintain a high QoS and an acceptable user experience, even in a non-stationary environment.

2. Related Art

High-bandwidth systems, including DSL systems, use single-carrier modulation as well as multi-carrier modulation schemes. Both DSL and other high-bandwidth systems such as wireless use modulation schemes such as Carrier-less Amplitude and Phase Modulation (CAP) and Discrete Multitone (DMT) for wired media and Orthogonal Frequency Division Multiplexing (OFDM) for wireless communication. One advantage of such schemes is that they are suited for high-bandwidth application of 2 Mbps or higher upstream (subscriber to provider) and 8 Mbps or higher downstream (provider to subscriber). Quadrature Amplitude Modulation (QAM) utilizes quadrature keying to encode more information on the same frequency by employing waves in the same frequency shifted by 90°, which can be thought of as sine and cosine waves of the same frequency. Since the sine and cosine waves are orthogonal, data can be encoded in the amplitudes of the sine and cosine waves. Therefore, twice as many bits can be sent over a single frequency using the quadrature keying. QAM modulation has been used in voice-band modem specifications, including the V.34.

CAP is similar to QAM. For transmission in each direction, CAP systems use two carriers of identical frequency above the 4 kHz voice band, one shifted 90° relative to the other. CAP also uses a constellation to encode bits at the transmitter and to decode bits at the receiver. A constellation encoder maps a bit pattern of a known length to a sinusoid wave of a specified magnitude and phase. Conceptually, a sinusoidal wave can be viewed to be in one-to-one correspondence with a complex number where the phase of the sinusoidal is the argument (angle) of the complex number, and the magnitude of the sinusoidal wave is the magnitude of the complex number, which in turn can be represented as a point on a real-imaginary plane. Points on the real-imaginary plane can have bit patterns associated with them, and this is referred to as a constellation and is known to one of ordinary skill in the art.

DMT modulation, sometimes called OFDM, builds on some of the ideas of QAM but, unlike QAM, it uses more than one constellation encoder where each encoder receives a set of bits that are encoded and outputs sinusoid waves of varying magnitudes and phases. However, different frequencies are used for each constellation encoder. The outputs from these different encoders are summed together and sent over a single channel for each direction of transmission. For example, common DMT systems divide the spectrum from 0 kHz to 1104 kHz into 256 narrow channels called tones (sometimes referred to as bins, DMT tones or sub-channels). These tones are 4.3125 kHz wide. The waveforms in each tone are completely separable from one another. In order to maintain separability, the frequencies of the sinusoidal used in each tone should be multiples of a common frequency known as the fundamental frequency and in addition the symbol period $\tau$, must be a multiple of the period of the fundamental frequency or a multiple thereof. The aggregate bit pattern which comprises the bit patterns mapped to constellations in each of the tones during a symbol period is often referred to as a DMT symbol. For the purposes here, time is often referred to in terms of DMT symbols meaning a symbol period.

The presence of impulse noise can occur in digital subscriber line (XDSL) systems due to electromagnetic interference from such sources as a telephone network, power system, and even from natural phenomena such as thunderstorms and lightning. The presence of impulse noise can significantly limit the reliability of real-time services such as video that can be supported by current generation xDSL systems, e.g., VDSL (Very High Speed DSL). In particular, impulse noise can cause physical layer cyclic redundancy check (CRC) errors and loss of packets in xDSL systems, thereby affecting such triple-play services as IPTV. Therefore, there has been substantial interest in the DSL community recently towards the development and standardization of impulse noise protection schemes.

Typically, the most common forms of impulse noise that are observed on a line are repetitive electrical impulse noise (REIN), and a short high impulse noise event (SHINE). Electromagnetic interference from telephone networks, fluorescent lights, power supply units of TVs or PCs, video recorders, electronic transformers, etc. in the vicinity of a particular line, can cause noise impulses having a repetitive character often proportional to the frequency of the power lines (60 Hz in the U.S. and 50 Hz in Europe). This is an example of REIN. Lightning would be an example of a source of SHINE.

To better understand approaches to combating impulse noise, the particular transmission layers involved in DSL are explained. FIG. 1 illustrates DSL communications layering. For the sake of example here, transmission is described from a transmitter (TX) 152 to a receiver (RX) 154 where the transmitter can be a central office (CO) and the receiver, a customer premises equipment (CPE). However, analogously the transmitter can be a CPE and the receiver can be a CO.

Within (TX) 152 is layer 122, the Transport Protocol Specific-Transmission Convergence (TPS-TC) layer. At this layer is the transport; application specific transports are implemented such as ATM or Ethernet. This layer can be further subdivided into a network processor layer which lies above a gamma interface.

The next layer is layer 124, the Physical Media Specific Transmission Convergence (PMS-TC) layer. This layer manages framing, transmission, and error control over the line. In particular, this layer comprises the forward error correction (FEC) codes such as the Reed-Solomon (RS) Codes. The interface between the TPS-TC and the PMS-TC layer is referred to as the alpha layer. It is very common that PMS-TC layer 124 comprises scrambler-RS encoder 102 and interleaver 104 to implement a RS code with interleaving (RS-ILV). DSL standards mandate the use of RS as the FEC.

The next layer is layer 126, the physical media dependent (PMD) layer also referred to as the physical (PHY) layer. This layer encodes, modulates and transmits data across physical links on the network. It also defines the network's physical signaling characteristics. In particular it translates data into symbols through the use of inverse fast Fourier Transforms and Trellis codes into DMT symbols. A Trellis code can also supply additional error correction. The interface between the PMD layer and the PMS-TC layer is referred to as the delta interface.

After processing by the PMD layer, the data is transmitted across DSL loop 140, where it is received by RX 154 using its PMD layer 136. In a receiving capacity PMD layer 136 decodes, demodulates and receives data across physical links on the network. Furthermore, PMS-TC layer 134 in a receiving capacity decodes data encoded by PMS-TC 124 and extracts data from the framing scheme. In particular it can comprise de-interleaver 106 and descrambler-RS decoder 108 to extract data encoded by PMS-TC 124. Finally, layer 132 is the receiving counterpart of the TPS-TC layer.

As mentioned above, in a legacy DSL system, RS-ILV is used as an FEC code. One difficulty with this approach is that the amount of redundancy built in the RS-ILV coding scheme shall be proportional to the amount of data corrupted by the impulse. Ultimately, the maximum allowed amount of redundancy may be insufficient to correct errors caused by long duration impulse noise such as SHINE. Furthermore, the more redundancy built into the RS-ILV code the lower the throughput. Increasing the redundancy in order to accommodate rare long duration impulse noise events is wasteful of bandwidth.

FIG. 2 illustrates a more detail description of the transmission side of the PMS-TC layer as disclosed by present xDSL standards. Data from the TPS-TC layer transmitted to the PMS-TC layer can use one of two latency paths and one of two bearer channels. Input 202 represents data on the first bearer channel designated for latency path #0. Input 204 represents data on the second and optional bearer channel designated for latency path #0. Input 206 represents data on the first bearer channel optionally designated for latency path #1. Input 208 represents data on the second bearer channel optionally designated for latency path #1. In addition, overhead data can be received by the PMS-TC layer including Embedded Operations Channel (EOC) 210, Indicator Bits (IB) Channel 212 and Network Timing Reference (NTR) 214, which can be combined by multiplexer (MUX) 218. In addition, MUX 216 combines inputs 202 and 204, and MUX 220 as part of optional latency path #1 combines input 206 and 208. MUX 222 combines the output of MUX 216 with a sync byte and overhead data from MUX 218. Similarly MUX 224 combines the output of MUX 220 with a sync byte and overhead data. Along each latency path, scrambler 222 and corresponding scrambler 224 scramble the data received from MUX 222 and MUX 224, respectively. FEC 226 and FEC 228 apply an FEC to the scrambled data from scramblers 222 and 224, respectively. Typically, the FEC used is a RS code and in the example of FIG. 1, scrambler-RS 102 comprises scramblers 222 and 224 and FECs 222 and 224, but are shown consolidated for compactness in FIG. 1. Interleaver 104 of FIG. 1 comprises interleaver 230 and interleaver 232 which performs the interleaving of the encoded data received from FEC 226 and FEC 228, respectively. Finally, MUX 234 combines the encoded interleaved data for both latency paths to produce output 240 which is ready for processing by the PMD layer.

It should be noted that the architecture of FIG. 3 is applicable to both transmission from the CO to the CPE (downlink) and from the CPE to the CO (uplink).

One approach taken in the past is to retransmit at the alpha interface. FIG. 3 illustrates a DSL system using retransmission. CO 352 is like (TX) 152 but further comprises a retransmission module 302. Whenever data is supplied from TPS-TC to PMS-TC, the data is framed into data transmission units (DTUs), then copied and stored in a retransmission module 302, e.g., in a first-in-first-out (FIFO) memory. Typically a DTU is one or more RS code words, but can be tied to other abstractions from the TPS-TC layer such as a block of ATM cells, or PTM cells. Similarly, CPE 354 like CO 352 comprises retransmission module 302.

When retransmission control module 304 detects a corrupt DTU such as using the failure indication of the RS decoder, a request for retransmission is sent from CPE 354 to CO 352 and more specifically from retransmission control module 302 to retransmission module 302. In order to identify the DTU to be retransmitted, each DTU must have a sequence identifier (SID) added. FIG. 4 shows the transmission side of a PMS-TC and retransmission module. The block diagram is similar to that which is standards based as shown in FIG. 2. Retransmission module 302 is shown inserted into the input path of latency path #0. Prior to retransmission module 302, SID 402 and retransmission control channel (RCC) 404 are combined into each DTU by MUX 304. On the CO side, SID 402 is used to identify the DTU. However, when CPE 254 requests retransmission, a request is inserted into the uplink transmission through RCC 404 along with the SID of the corrupt DTU. To clarify, in the context of downlink transmission, SID 402 is used to identify a DTU. In the context of retransmission, SID 402 and RCC 404 are combined into the uplink transmission. Upon receiving the request by retransmission module 202, the CO 352 retransmits the corrupted DTU.

The prior retransmission solutions offer a number of alternatives for incorporating the SID in the downlink transmission and the RCC in the uplink transmission. FIG. 5 illustrates an alternative where retransmission module 504 resides within the PMS-TC layer. FIG. 6 illustrates another alternative where retransmission module 1004 resides just above the delta layer.

One difficulty with this approach is that the retransmission time because of the need to traverse the PMS-TC layers on both the CO and CPE can be as high as 5 milliseconds. Furthermore, a retransmission approach can clog up transmission over the DSL loop if a REIN source exhibits a short inter-arrival-time (IAT). For example, if the IAT of a REIN source is less than the round trip time of the retransmission request, a new impulse would be experienced causing another retransmission.

Another difficulty is that in both the transmission of the DTU and the retransmission request a SID needs to be transmitted. This can particularly be a drain on bandwidth in an ADSL system where the uplink capacity is smaller than the downlink. Additionally, the use of retransmission is essentially mutually exclusive to the FEC rather than cooperative. The FEC only serves as a detector for retransmission and its error correcting capabilities are not fully exploited.

Accordingly, various needs exist in the industry to address the aforementioned deficiencies and inadequacies.

SUMMARY OF INVENTION

An impulse noise protection system and method comprising retransmission at the DMT symbol level can enable the retransmission of corrupt DMT symbols without the need to attach a sequence identification tag to each DMT symbol; a constant indicator of received DMT symbols status can be transmitted back to the sender. If the indicator is indicative of a bad status, the sender can retransmit the corrupted DMT symbol.

In addition, not every corrupted DMT symbol needs to be retransmitted, if the existing FEC scheme has sufficient error correction capability (ECC) remaining. Specifically, retransmission is employed only when the ECC of the FEC has been exhausted.

Additionally, blanking can be integrated into the impulse noise protection system. If sufficient statistics relating to REIN sources are known, blanking can optionally be employed. By using blanking, the ECC required to accommodate other noise sources can be reduced enabling the existing FEC to address other noise sources.

Finally, blanking can be used in combination with the FEC without necessarily implementing retransmission. If sufficient statistics are available to permit blanking, the ECC of the FEC can be set so that the probability of exceeding the ECC of the FEC from noise other than those accounted for by REIN sources is small.

The impulse noise protection system allows for the combination of two or more of the three techniques mentioned above, including retransmission, FEC and blanking. Blanking can help reduced the required ECC of the FEC. Better impulse noise statistics allow the optimization of ECC of the FEC. The FEC can also be used to reduce the amount of data required for retransmission.

Other systems, methods, features, and advantages of the present disclosure will be or become apparent to one with ordinary skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 7:
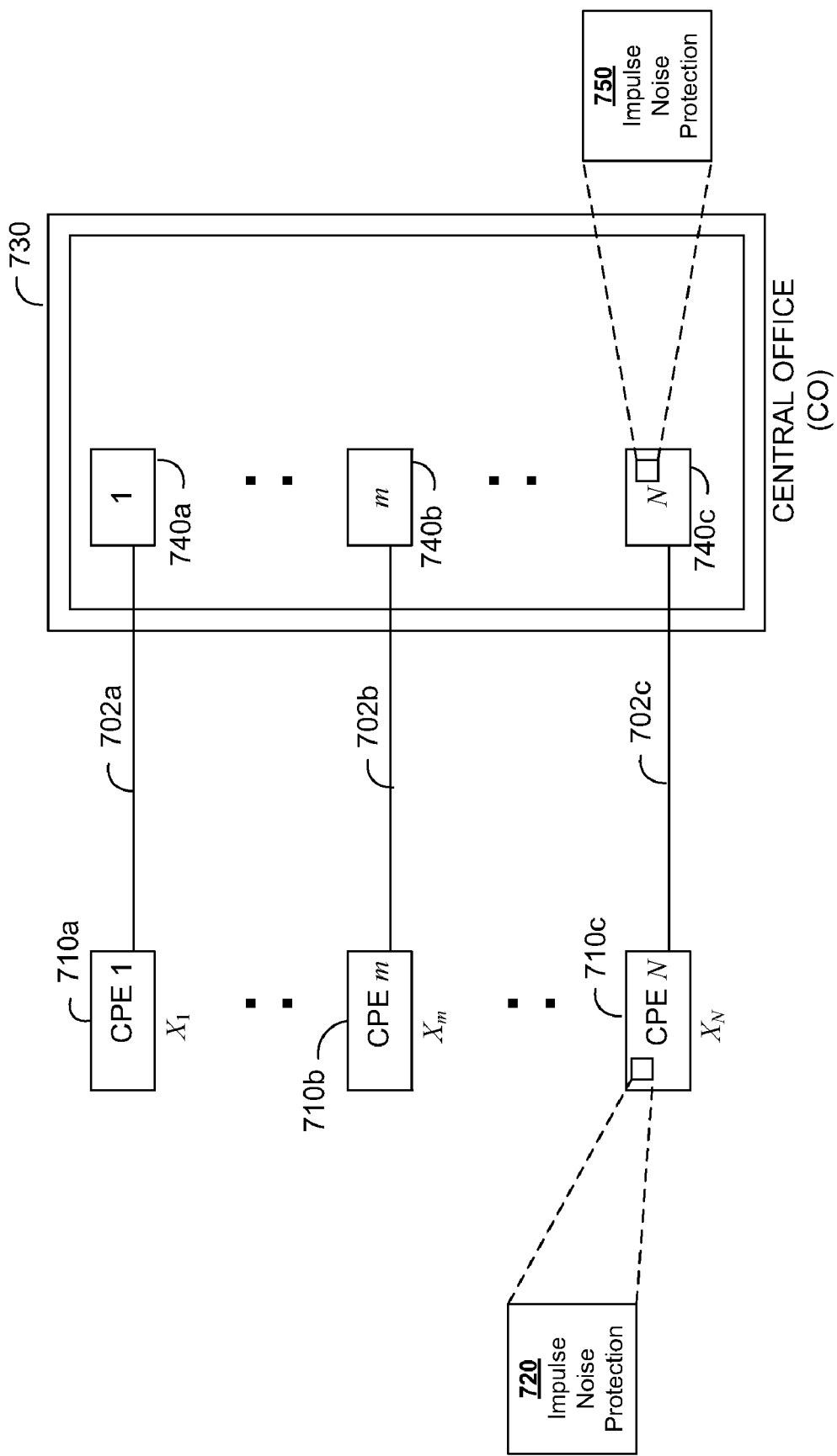
FIG. 7 illustrates an xDSL system in which embodiments for impulse noise protection are applied.

Reference is now made to FIG. 7, which illustrates an xDSL system in which embodiments for impulse noise protection are applied. In the non-limiting example shown in FIG. 7, N end users (or N sets of CPE 710a, 710b, 710c) are depicted where each user 710a, 710b, 710c is referenced using an index m. The end users 710a, 710b, 710c are connected via a loop 702a, 702b, 702c to a CO 730. The CO 730 may include an xDSL access multiplexer (DSLAM), xDSL line cards 740a, 740b, 740c, and other equipment for interfacing with end users 710a, 710b, 710c.

In accordance with some embodiments, an impulse noise protection module 720 for protection against impulse noise, which can include monitoring and characterizing impulse noise, may be incorporated into the end users/CPE 710a, 710b, 710c. While embodiments for impulse noise protection are described here in the context of CO 730 transmitting to CPE 710a, 710b, 710c, the principles discussed herein can also be applied to CPE 710a, 710b, 710c transmitting to CO 730. Each CPE can comprise impulse noise protection module 720 and each CO can comprise impulse noise protection module 750.

Figure 8:
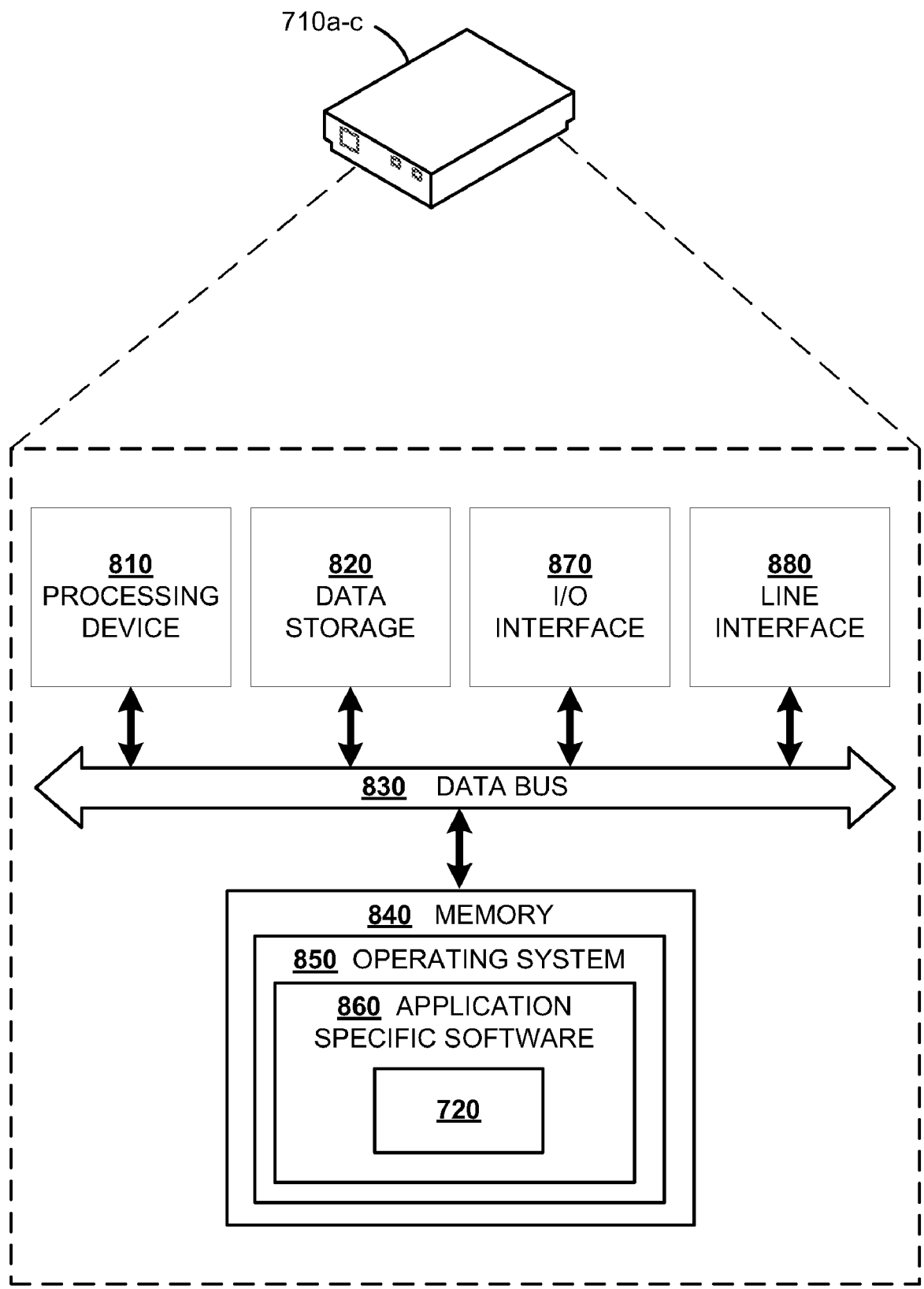
FIG. 8 is a block diagram of an embodiment of one of the end users depicted in FIG. 7.

Reference is now made to FIG. 8, which is a block diagram of an embodiment of one of the end users depicted in FIG. 7. In accordance with certain embodiments, the steps for performing protection against impulse noise sources described in this disclosure may be incorporated in software within an end user such as a DSL modem. One of ordinary skill in the art will appreciate that DSL modems comprise other components, which have been omitted for purposes of brevity. Generally, DSL modem 710a-c may include processor 810, memory component 840 (which may include volatile and/or nonvolatile memory components), and data storage component 820 that are communicatively coupled via a local interface 830 such as a data bus. In addition, the DSL modem 710a-c comprises an input/output interface 870 which can be coupled to an end user device such as a PC, router, wireless access point, etc. and can be an Ethernet interface. DSL modem 710a-c further comprises line interface 880 which can be coupled to the DSL loop to communicate with a CO. Line interface 880 can comprise elements such as a line driver, analog front end and DSL transceiver.

The local interface 830 may have additional elements, which are omitted for simplicity, such as controllers, buffers (caches), drivers, repeaters, and receivers to enable communications. Further, the local interface may include address, control, and/or data connections to enable appropriate communications among the aforementioned components. Processor 810 may be a device for executing software, particularly software stored in memory component 840. Processor 810 can be any custom made or commercially available processor, a central processing unit (CPU), an auxiliary processor among several processors associated with DSL modem 710a-c, a semiconductor based microprocessor (in the form of a microchip or chip set), a macroprocessor, or generally any device for executing software instructions.

Memory component 840 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, memory component 840 may incorporate electronic, magnetic, optical, and/or other types of storage media. One should note that some embodiments of memory component 840 can have a distributed architecture (where various components are situated remotely from one another), but can be accessed by processor 810.

The software in memory component 840 may include one or more separate programs, each of which includes an ordered listing of executable instructions for implementing logical functions. In the example shown in FIG. 8, the software in the memory component 840 may include an operating system 850. Furthermore, the software residing in memory 840 may include application specific software 860, which may further comprise the impulse noise module 720 depicted in FIG. 7. It should be noted, however, that these modules can be implemented in software, hardware or a combination of software and hardware. The operating system 850 may be configured to control the execution of other computer programs and provides scheduling, input-output control, file and data management, memory management, and communication control and related services.

A system component and/or module embodied as software may also be constructed as a source program, executable program (object code), script, or any other entity comprising a set of instructions to be performed. When constructed as a source program, the program is translated via a compiler, assembler, interpreter, or the like, which may or may not be included within the memory component 840, so as to operate properly in connection with the operating system 850. When the DSL modem 710a-c is in operation, the processor 810 may be configured to execute software stored within the memory component 840, communicate data to and from the memory component 840, and generally control operations of the DSL modem 710a-c pursuant to the software. Software in memory may be read by the processor 810, buffered within the processor 810, and then executed.

Figure 9:
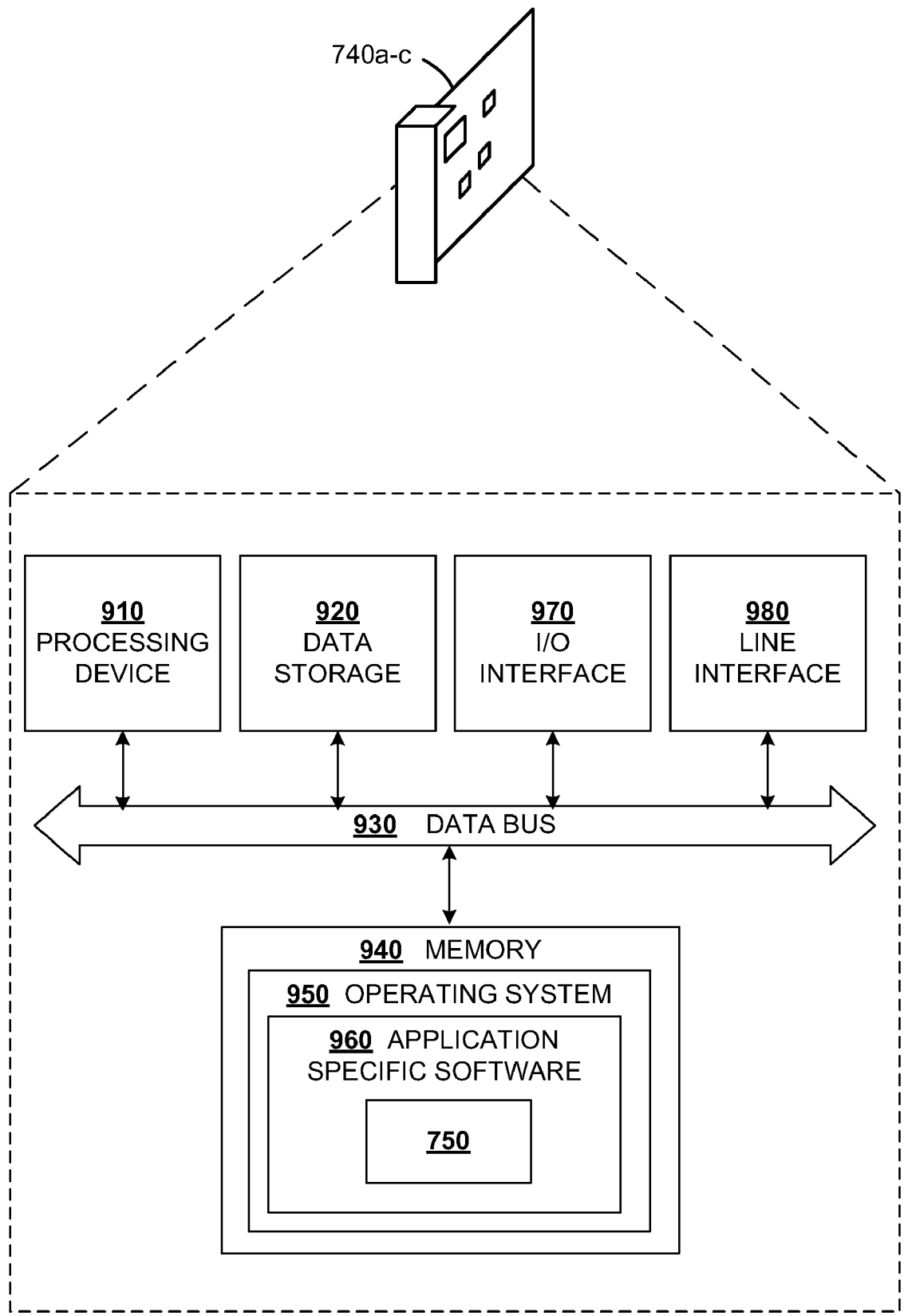
FIG. 9 is a block diagram of an embodiment of one of the line cards depicted in FIG. 7.

Reference is now made to FIG. 9, which is a block diagram of an embodiment of one of the line cards depicted in FIG. 7. In accordance with certain embodiments, the steps for performing protection against impulse noise sources described in this disclosure may be incorporated in software within a central office device such as a line card. One of ordinary skill in the art will appreciate that DSL line cards comprise other components, which have been omitted for purposes of brevity. Generally, line cards 740a-c may include a processor 910, a memory component 940 (which may include volatile and/or nonvolatile memory components), and a data storage component 920 that are communicatively coupled via a local interface 930, such as a data bus. In addition, line cards 740a-c comprise an input/output interface 970 which can be coupled to other components within a CO. Furthermore, line cards 740a-c further comprise line interface 980 which can be coupled to the DSL loop to communicate with a CPE. Line interface 980 can comprise elements such as a line driver, analog front end and DSL transceiver.

The local interface 930 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 910 may be a device for executing software, particularly software stored in the memory component 940. The processor 910 can be any custom made or commercially available processor, a CPU, an auxiliary processor among several processors associated with the line cards 740a-c, a semiconductor based microprocessor (in the form of a microchip or chip set), a macroprocessor, or generally any device for executing software instructions.

The memory component 940 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory component 940 may incorporate electronic, magnetic, optical, and/or other types of storage media. One should note that some embodiments of the memory component 940 can have a distributed architecture (where various components are situated remotely from one another), but can be accessed by the processor 910.

The software in memory component 940 may include one or more separate programs, each of which includes an ordered listing of executable instructions for implementing logical functions. In the example shown in FIG. 9, the software in the memory component 940 may include an operating system 950. Furthermore, the software residing in memory 940 may include application specific software 960, which may further comprise the impulse noise protection module 750 depicted in FIG. 7. It should be noted, however, that these modules can be implemented in software, hardware or a combination of software and hardware. The operating system 950 may be configured to control the execution of other computer programs and provides scheduling, input-output control, file and data management, memory management, and communication control and related services.

A system component and/or module embodied as software may also be constructed as a source program, executable program (object code), script, or any other entity comprising a set of instructions to be performed. When constructed as a source program, the program is translated via a compiler, assembler, interpreter, or the like, which may or may not be included within the memory component 940, so as to operate properly in connection with the operating system 950. When the line cards 740a-c are in operation, the processor 910 may be configured to execute software stored within the memory component 940, communicate data to and from the memory component 940, and generally control operation of the line cards 740a-c pursuant to the software. Software in memory may be read by the processor 910, buffered within the processor 910, and then executed.

Figure 10:
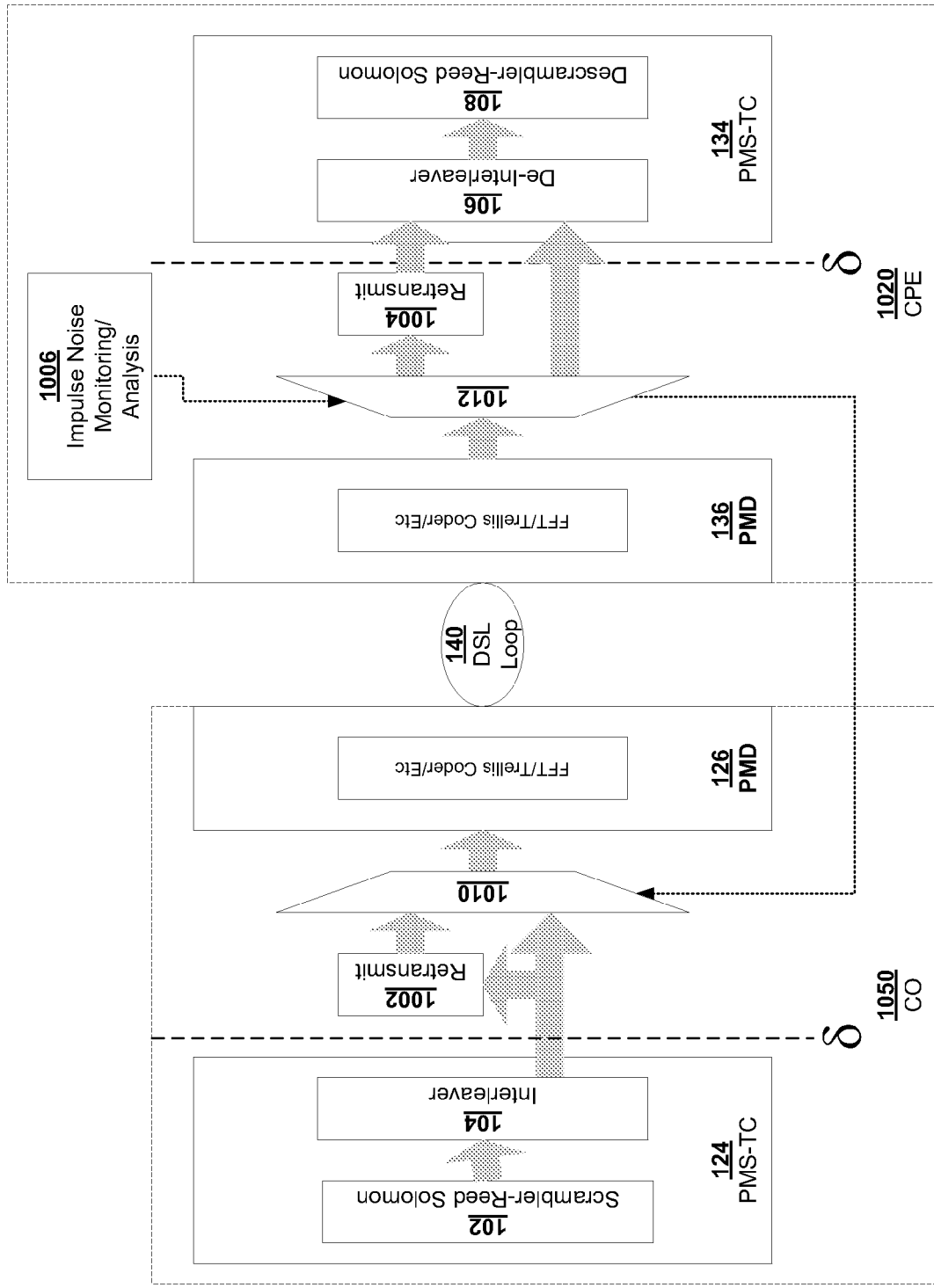
FIG. 10 shows embodiments of the transmit side of the impulse noise protection module within the CO and the receive side of the impulse noise protection module within the CPE.

FIG. 10 shows embodiments of the transmit side of the impulse noise protection module within the CO and the receive side of the impulse noise protection module within the CPE. For clarity in this and subsequent figures, the TPS-TC layer is omitted. Impulse noise protection module 720 comprises PMS-TC layer 134 and PMD layer 136 which can operate in accordance with the appropriate DSL standard. At the delta interface, is impulse monitoring for IMUNE module 1012. Impulse noise protection module 720 also comprises impulse noise monitoring/analysis module 1006 which characterizes impulse noise observed on the line and generates useful parameters relating to the impulse noise, such as the number of sources, the nature of the sources, the impulse lengths of the sources and the IAT of the sources. It should be noted that the term impulse length is intended to take the broader meaning of equivalent impulse noise protection (INP) which is defined in the DSL standard. Based on the complexity desired, impulse noise monitoring/analysis module 1006 can collect impulse noise monitoring (INM) statistics in accordance with the present DSL standards, or it can be far more detailed in its analysis. An implementation of the latter is disclosed in U.S. patent application entitled, "Systems and Methods for Impulse Noise Characterization," having Ser. No. 12/348,565, filed on Jan. 5, 2009, which is incorporated by reference in its entirety. Impulse noise protection module 720 further comprises retransmission memory 1004 which is used to store uncorrupted DMT symbols in corrupted frames.

Impulse noise protection module 750 comprises PMS-TC layer 124 and PMD layer 126 which can operate in accordance with the appropriate DSL standard. At the delta interface, is IMUNE module 1010. In addition, impulse noise protection module 750 further comprises retransmission memory 1002. When encoded data is received from interleaver 104, it is also stored for a short time in retransmission memory 1002 such as with a FIFO. The encoded data is transmitted as one or more transmission packets, such as DMT symbols.

Figure 1:
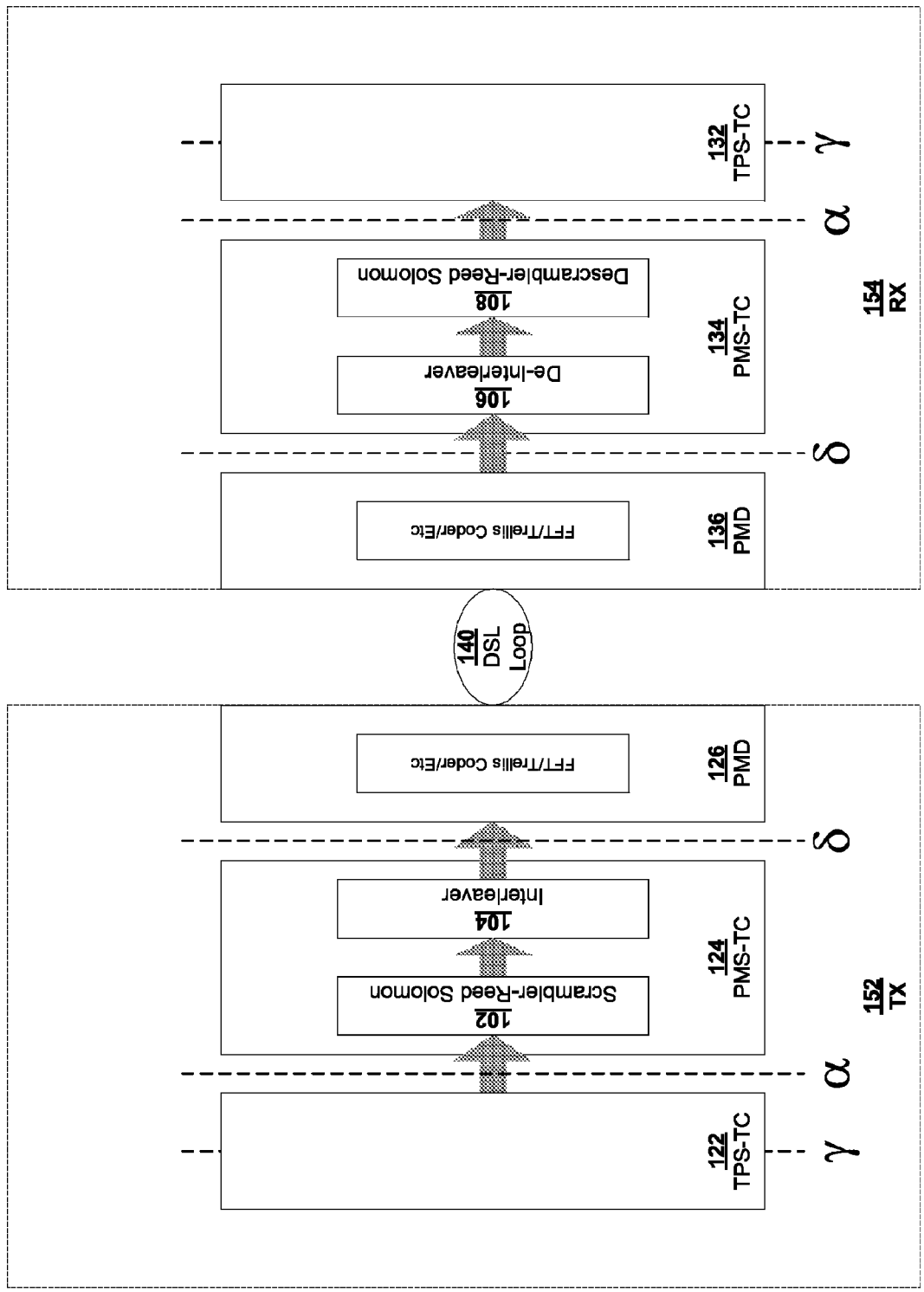
FIG. 1 illustrates DSL communications layering.
Figure 2:
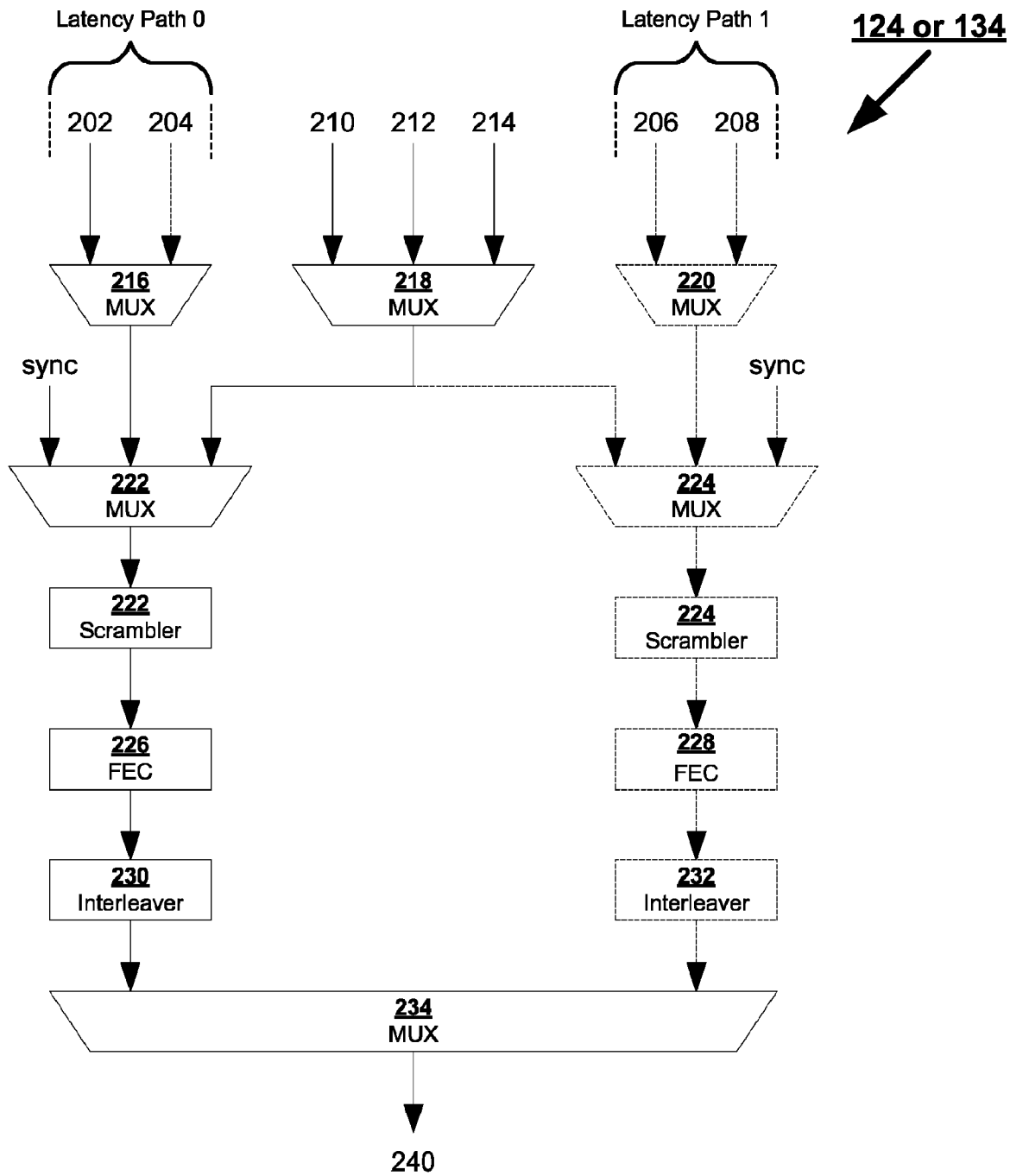
FIG. 2 illustrates a more detail description of the transmission side of the PMS-TC layer as disclosed by present xDSL standards.
Figure 3:
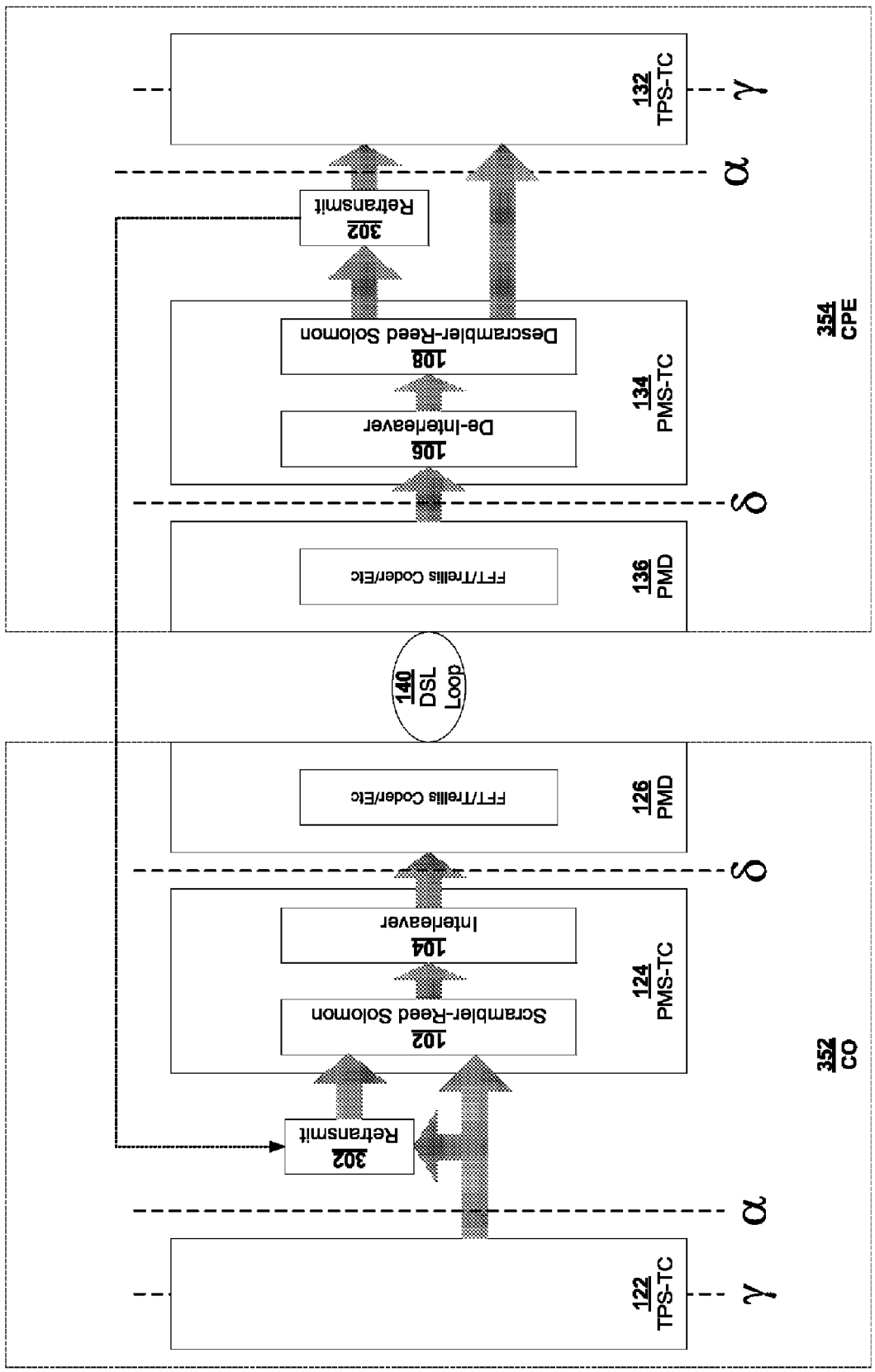
FIG. 3 illustrates a DSL system using retransmission.

CPE 1050 receives the transmission packets, when IMUNE module 1012, receives indication from impulse noise monitoring/analysis module 1006 that a transmission packet is corrupted which may be due to impulse noise; then IMUNE module 1012 may communicate to IMUNE module 1010 to retransmit the corrupted transmission packet. Unlike the system in FIG. 3, in order for IMUNE module 1010 to communicate to IMUNE module 1012, the request need only traverse PMD 136 over DSL loop 140 and through PMD 126 to reach IMUNE module 1012 which provides a round trip retransmission delay of 2.5 milliseconds which is half of the round trip retransmission delay of the system in FIG. 3. In the most basic manner of operation, if IMUNE module 1012 receives an indication of a corrupt transmission packet, IMUNE module 1012 can elect to retransmit the corrupted transmission packet. Because DSL communications warrant transmission packets received by PMD layer 136 to be delivered to the PMS-TC layer 134 in sequence, if a retransmission is warranted for a particular transmission packet, all subsequent transmission packets or at least the uncorrupted transmission packets, are stored in retransmission memory 1004 which also can be a FIFO, until either the retransmitted transmission packet is received or sufficient time has passed to simply give up on the corrupt transmission packet, at which time the transmission packets stored in retransmission memory can be passed on to the PMS-TC layer 134 where they can be decoded. If multiple corrupt transmission packets are detected, only those stored transmission packets following a received retransmitted transmission packet are passed on to the PMS-TC 134; the remaining packets remain in memory until the appropriate transmission packet is retransmitted. While the retransmission requires some transmission packets to wait, it still has a much shorter delay than the system in FIG. 3.

Because there is a delay even in the retransmission scheme described above, it is desirable to avoid retransmission when possible. Since DSL systems are equipped with a mandatory FEC scheme, the ECC of the FEC scheme can be exploited to minimize the amount of retransmission. For a given number of transmission packets encountered, the ECC of an FEC scheme is the number of corrupt transmission packets that can be corrected with the FEC scheme. For example, the ECC of an FEC could be the ability to correct 4 out of 100 transmission packets. Due to this capability, some corrupt transmission packets can be allowed to be passed on to PMS-TC layer 134 without requesting retransmission.

For example, suppose the FEC scheme has an ECC that can correct 4 out of 100 transmission packets. Suppose the impulse noise statistics indicate the currently received transmission packet is corrupt and there were only 2 corrupted packets in the last 100 transmission packets, then the corrupt transmission packet is allowed to pass on to the PMS-TC layer 134 because the FEC scheme has sufficient ECC to accommodate a third error in the last 100 transmission packets. However, suppose the impulse noise statistics indicate the currently received transmission packet is corrupt and there have been 4 corrupt transmission packets already encountered and passed on to PMS-TC layer 134 within the last 100 transmission packets; then the ECC of the FEC scheme would not tolerate another corrupt transmission packet so a retransmission is requested. In this manner bandwidth in retransmitting data is reduced.

Either IMUNE module 1010 or IMUNE module 1012 can decide whether allowing a corrupt transmission packet to be passed on to PMS-TC layer 134 would exceed the ECC of the FEC scheme; if not, the corrupt transmission packet is passed on to the PMS-TC layer 134 where the de-interleaver 106 and scrambler-RS code 104 can correct the corrupt transmission packet.

Figure 4:
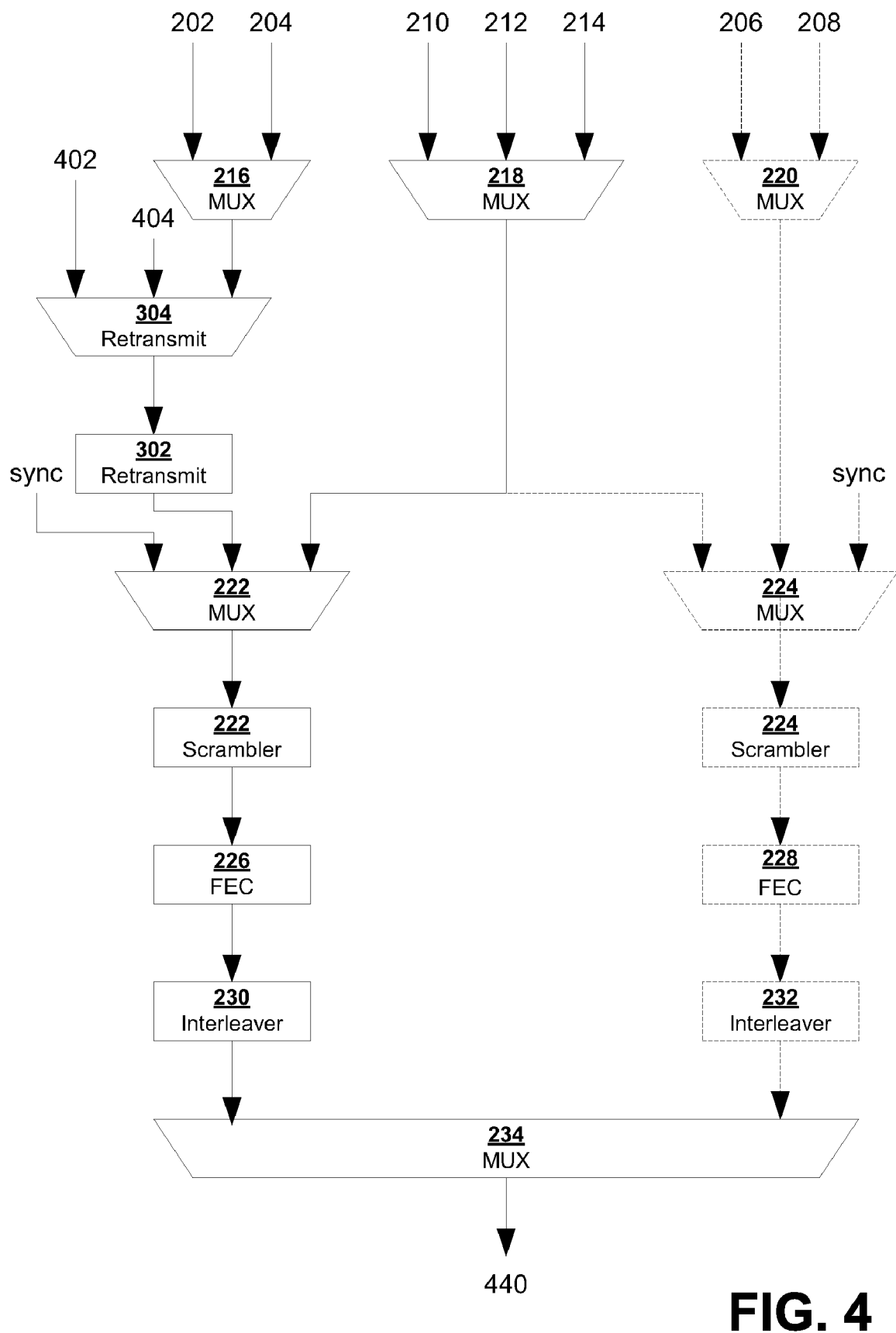
FIG. 4 shows the transmission side of a PMS-TC and a retransmission module.
Figure 5:
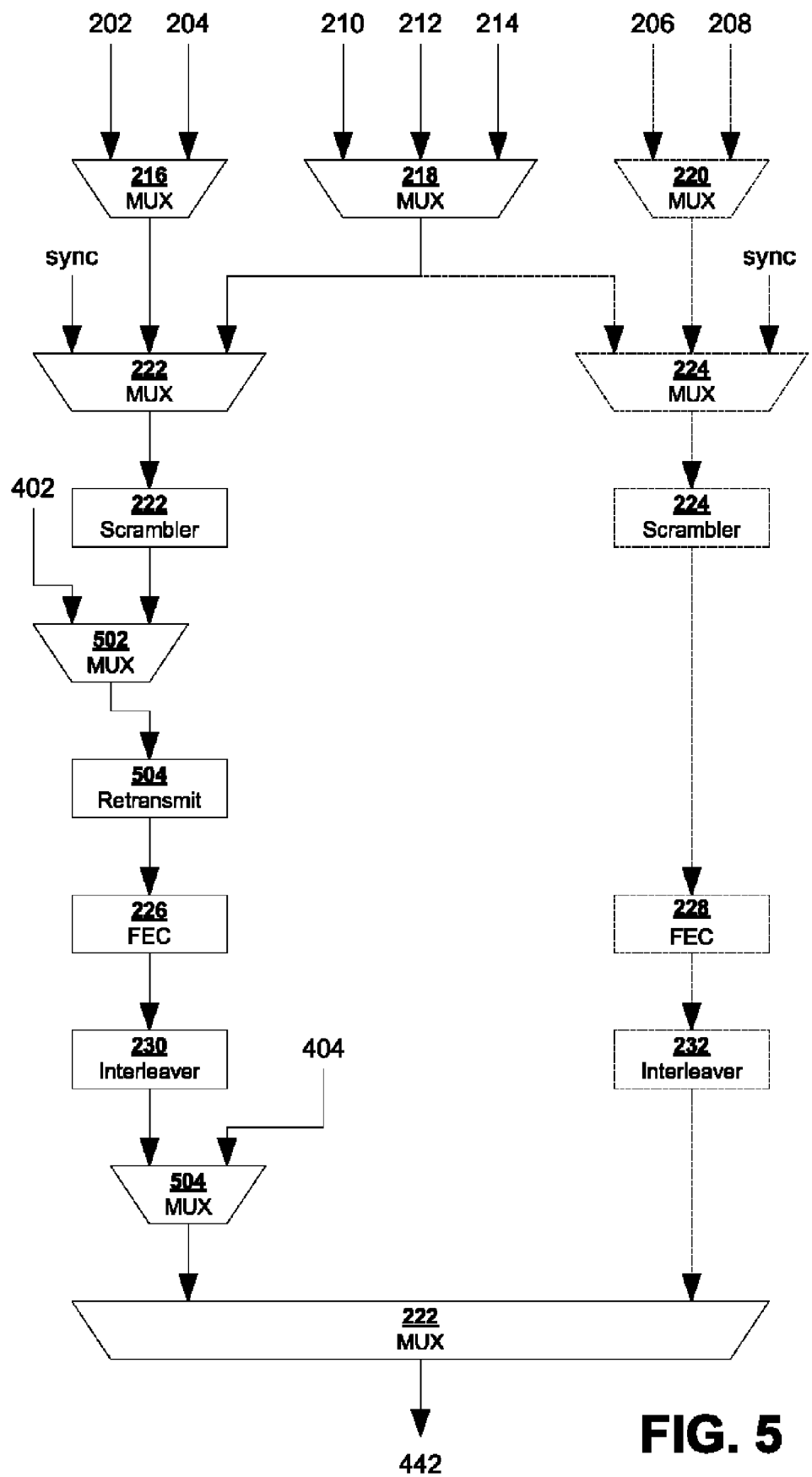
FIG. 5 illustrates an alternative where a retransmission module resides within the PMS-TC layer.
Figure 6:
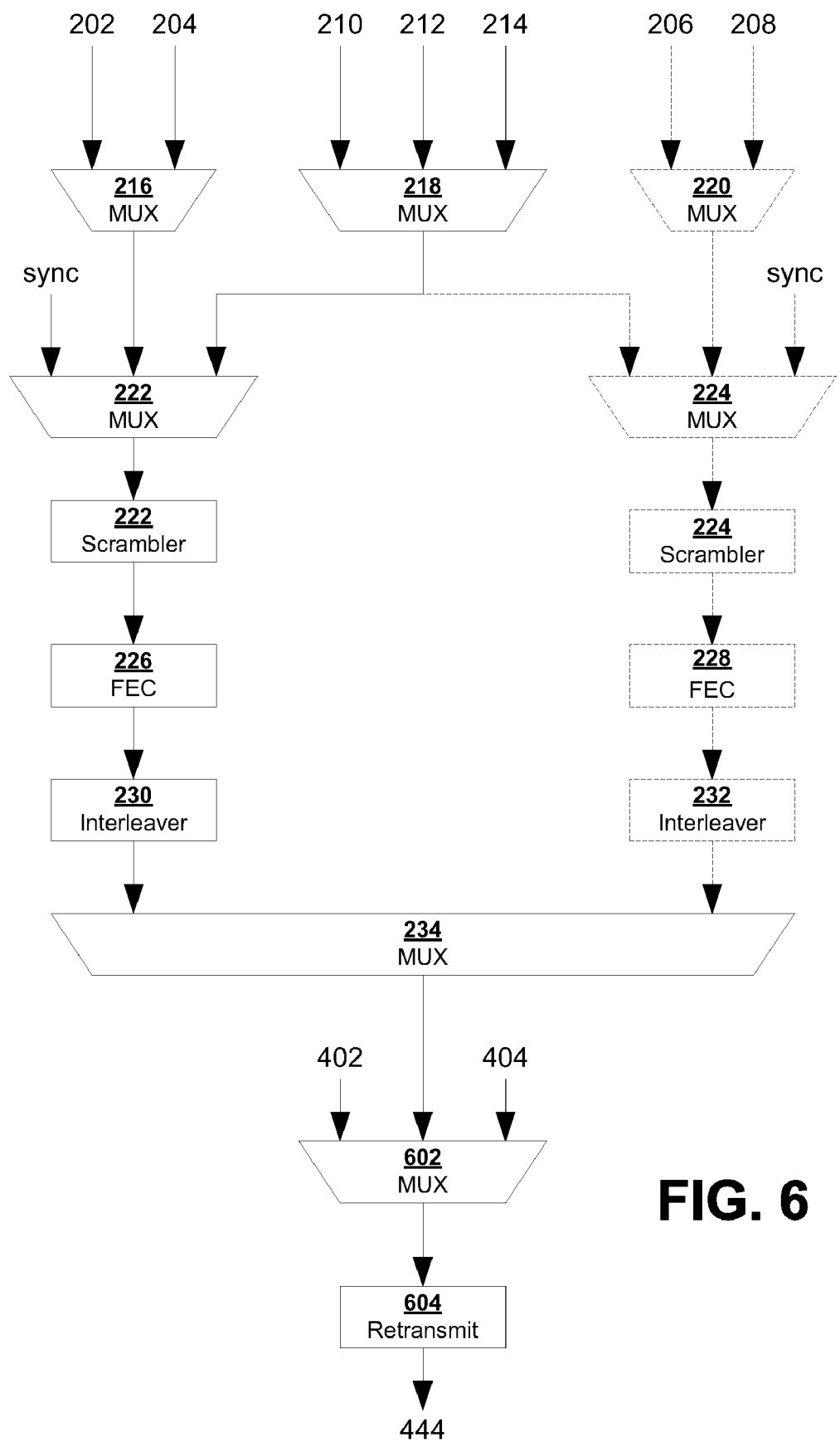
FIG. 6 illustrates another alternative where retransmission module resides just above the delta layer.

Specifically, when the transmission packet is a DMT symbol, IMUNE module 1012 can indicate a request to retransmit a corrupt transmission packet to IMUNE module 1010 without the need to attach an identifier to each transmission packet. Rather than transmit a retransmission request, a status bit is attached to each transmission packet in the uplink transmission (or equivalently if the roles of the CO and CPE are reversed the status bit would be attached to each transmission packet in a downlink transmission). This in the same way the RCC is attached in FIGS. 4-6 or by introducing it to latency path #1. One of ordinary skill will recognize the relative benefits of each in terms of standard compliance versus efficiency or minimizing round trip delay. If additional reliability is desired for the retransmission request, an error correction code such as a small block code (e.g., Hamming code, Golay code) or RS code and interleaving could be used in place of a single status bit.

Because one DMT symbol is transmitted in each DMT symbol period, there is a one to one correspondence between uplink and downlink DMT symbols; that is, there is a DMT symbol transmitted in the uplink whenever a DMT symbol is received in the downlink, and vice versa, so when a downlink DMT symbol is received in the downlink, then in the next DMT symbol in the uplink contains a status bit describing the received condition of the received downlink DMT symbol. In this way, timing rather than an attached identifier is indicative of the DMT symbol which needs to be retransmitted.

Figure 11:
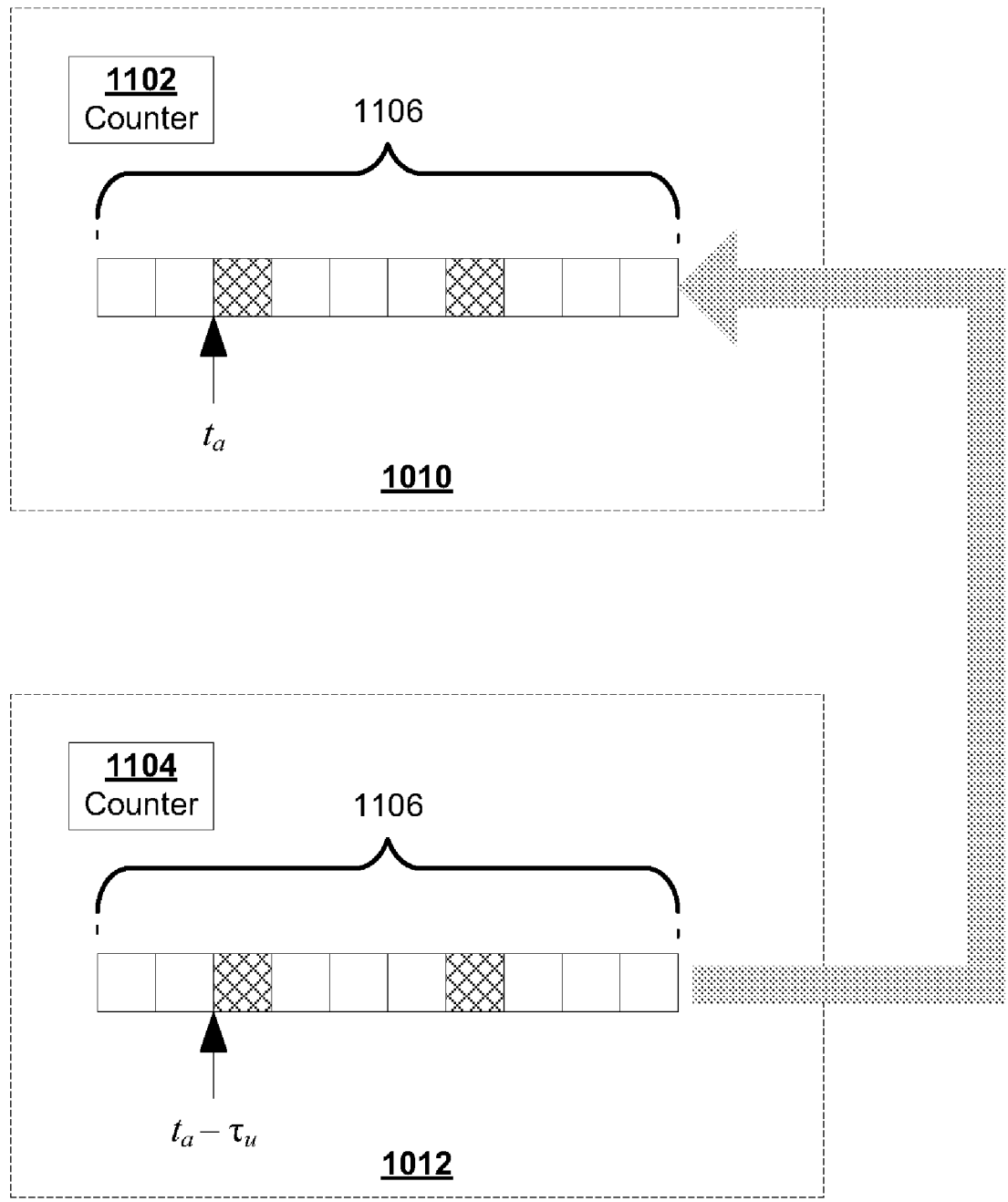
FIG. 11 shows block diagrams of exemplary embodiments of a transmit side IMUNE module and a receive side impulse monitoring for universal noise eliding (IMUNE) module.

FIG. 11 shows block diagrams of exemplary embodiments of IMUNE module 1010 and IMUNE module 1012. Each module maintains counters 1102 and 1104 which can be synchronized during startup. IMUNE module 1012 continually transmits DMT symbol status stream 1106 back to IMUNE module 1010. When a bad status (as indicated in the example by crosshatching in DMT status stream 1106), is detected, the arrival time, $t_a$, of the DMT symbol containing the bad status on the uplink is retrieved from counter 1102. Since the downlink transit time, $\tau_d$ and the uplink transit time $\tau_u$ are determined during startup, the transmission time of the bad DMT symbol can be calculated as $t_a - \tau_u - \tau_d$. In another variation, a retransmission processing overhead time, $t_r$, can be added to the equation if the processing takes more than one DMT symbol, that is the transmission time is $t_a-\tau_u-\tau_d-t_r$. In a similar way, timer 1104 can be used by IMUNE module 1012 to determine the time or approximate time to expect the retransmitted data minimizing the amount of identifying data that is added to the retransmitted DMT symbol. For example, if a bad status is transmitted at time $t_b$, the transmitter receives the status at $t_b+\tau_u$. The transmitter retransmits the DMT symbol and it arrives at time $t_b+\tau_u+\tau_d$. In a similar variation, a fixed transmitter side retransmission processing overhead time $t_r$ can be added, so the retransmitted DMT symbol would arrive at time $t_b+\tau_u+\tau_d-t_r$. In the event a retransmission is not possible, the transmitter could send a dummy DMT symbol that the receiver would insert into the frame where eventually the RS code would fail.

In an alternative embodiment, rather than transmit a single status bit, whether encoded or not, in a return DMT symbol, the return DMT symbol can contain the status of the current received DMT symbols along with that of the previous n−1 DMT symbols. In this way, even if one or more DMT symbols is corrupted, the status of the downlink DMT symbol can be obtained from any number of uplink DMT symbols. In this embodiment, the retransmitted DMT symbol can still be identified by the timing. However, the receiver would expect the retransmission at time $t_b+\tau_u+\tau_d+(n-1)\tau$, where τ is the symbol period. In other words, the receiver allows time for the transmitter to examine all possible status indications for a given DMT symbol. In the event of conflicting status indications from different return DMT symbols, any number of error correction approaches can be taken such as majority voting, etc.

An example of an implementation of the status transmitted back to the transmitter could be to transmit n status bits representing the status of the current received DMT symbols along with the previous n−1 DMT symbols. However, if n is large it may not be desirable to occupy a large number of bits to represent received DMT symbols especially if corrupt DMT symbols are a relatively rare event. In such a case, a sparse code could be used to carry the status information. In particular, since it is in the nature of impulse noises that consecutive corrupt DMT symbols are seen, the receiver transmit one or more range(s) of received corrupted DMT symbols, or an empty range if it was determined that there was no corruption within the last n received DMT symbols.

Alternatively, a hybrid approach can be used where retransmission is indicated through a continual status transmission, but a retransmitted DMT symbol is transmitted attached to a time index of the bad DMT symbol or some other identifier.

Figure 12:
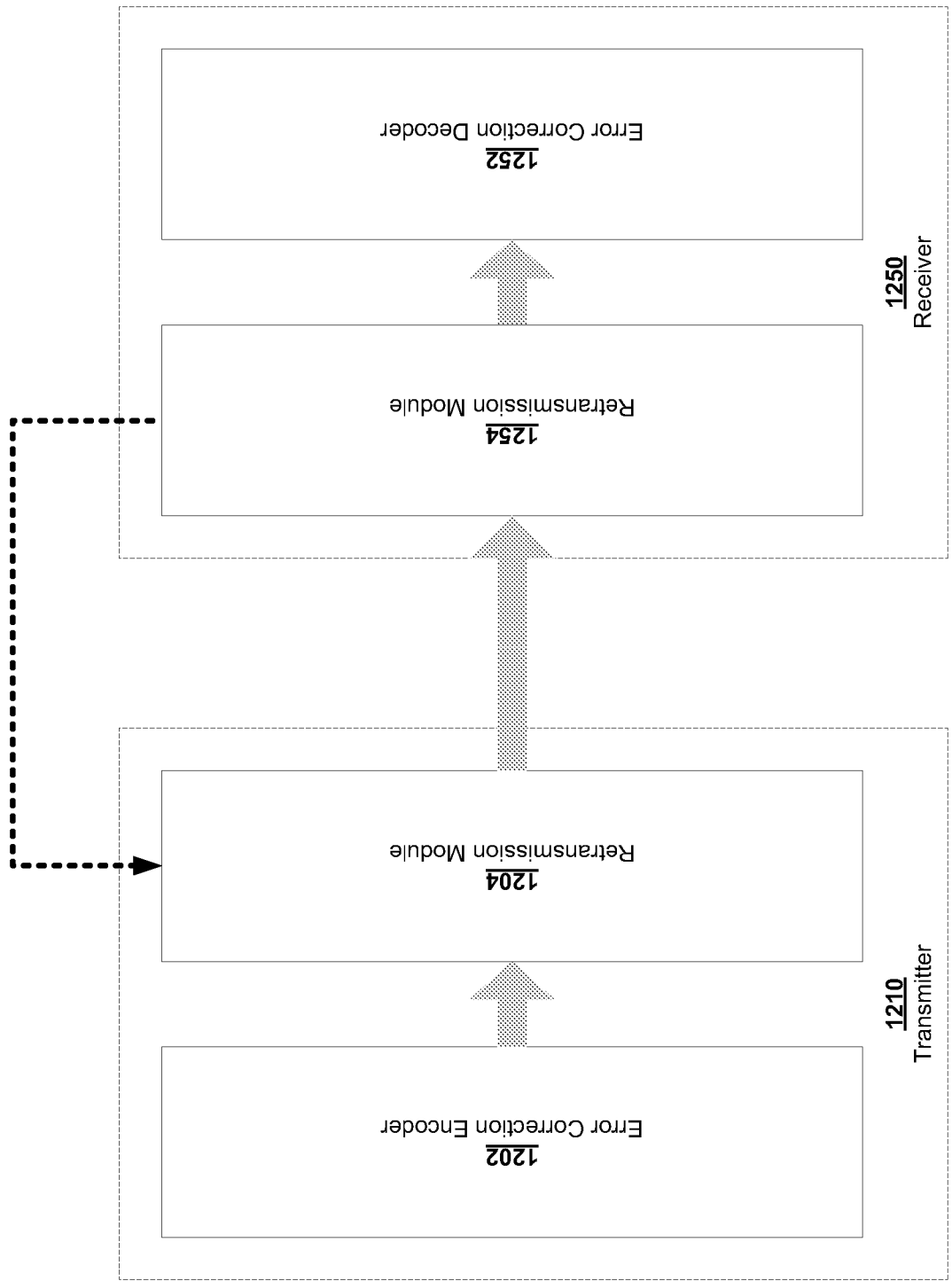
FIG. 12 illustrates a transmission system where a retransmission system is put into place within an error correction system.

This principle can be applied beyond a DSL system. FIG. 12 illustrates a transmission system where a retransmission system is put into place within an error correction system. Data is received by error correction encoder 1202 which is encoded with an error correction code into a transmission packet, this can include interleaving and scrambling. The transmission packet is stored by retransmission module 1204 which can comprise a retransmission memory. The transmission packet is then transmitted over connection 1206 to receiver 1250. The received transmission packet is then checked for corruption by retransmission module 1254 which determines whether the received transmission packet is corrupt. In one embodiment, if the received transmission packet is corrupt, retransmission module 1254 determines whether this is beyond the ECC of the error correction code. If so, retransmission or a status is indicated back to retransmission module 1204. In another embodiment, retransmission module 1254 indicates a retransmission request or a status back to retransmission module 1204 in all cases of a corrupt transmission packet. Retransmission module 1204 can decide whether to retransmit the packet based on the ECC of the error correction scheme. If retransmitted data is received, retransmission module 1254 assembles the received retransmitted transmission packet with any previously sent good data stored in a retransmission memory in order to reconstitute the original data format. For example, in DSL the original data format is a sequence of DMT symbols. However, in other systems, the original format may be a frame comprising a plurality of transmission packets. The data that is reconstituted is sent to the error correction decoder 1252 which can decode the reconstituted data.

While in the transmitter, the retransmission module is shown after the error correction encoder in the data transmission path. It should be noted that the retransmission module could also be implemented before the error correction encoder. In such an alternate embodiment, the error correction decoder would precede the retransmission module in the data reception path in the receiver.

Figure 13:
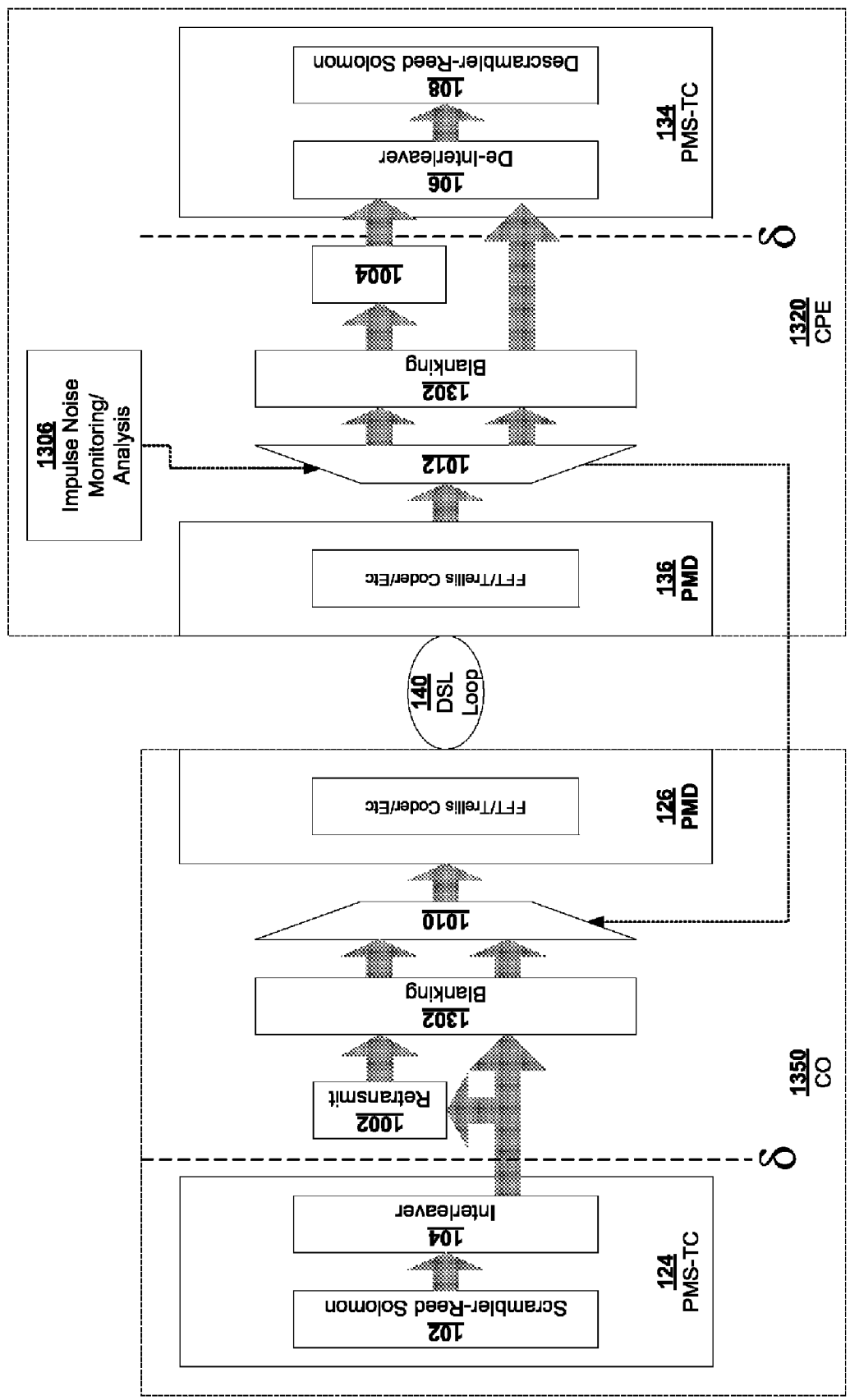
FIG. 13 shows alternative embodiments of the transmit side of the impulse noise protection module within the CO and the receive side of the impulse noise protection module within the CPE.

FIG. 13 shows alternative embodiments of the transmit side of the impulse noise protection module within the CO and the receive side of the impulse noise protection module within the CPE. In addition to the components described for FIG. 11, this embodiment of impulse noise protection module 720 further comprises blanking module 1102 and this embodiment of impulse noise protection module 750 further comprises blanking module 1104.

In this embodiment impulse noise monitoring/analysis module 1306 supplies more extensive statistics in particular relating to repetitive impulse noise such as REIN. The following can be used when impulse noise timing is known. During periods of known impulse noise, the receiver can ignore anything that may come on the line, that is, it treats the transmission as "blank." Specifically during these blanking periods, blanking module 1102 ignores anything which may come on the line. On the transmission side, blanking module 1104 does not transmit any meaningful data. Due to various implementation options, blanking module 1104 can elect not to transmit any data, can simply repeat the previously transmitted data, or can repeat the same DMT symbol over and over again. This is especially useful if periodic noise is encountered on the line because the noise can potentially be predicted. If IMUNE module 1012 receives enough information (e.g., from impulse noise monitoring/analysis module 1306) as to the timing and duration of an impulse source (e.g., impulse length, IAT and impulse offset) it has sufficient information to predict the occurrence of an impulse event. IMUNE module 1012 can determine the blanking periods and transmit that information to IMUNE module 1010. IMUNE module 1012 can then set the blanking periods to ignore reception in blanking module 1104. At the same time IMUNE module 1010 can then set the blanking period to cease transmission in blanking module 1102. The necessary blanking information can be sent from IMUNE module 1012 to IMUNE module 1010 or more generally from CPE 1320 to CO 1350 in a standard compliant manner by transmitting the information using the EOC.

Furthermore, IMUNE module 1012 is aware of the interleaving depth and the amount of redundancy built into the RS code used, as described, it is aware of how much data if any needs to be retransmitted in the event of corrupt DMT symbols. If impulse noise monitoring/analysis module 1306 does not give precise enough timing information to employ blanking, it still can be used to adjust the interleaving depth and/or the amount of redundancy in the FEC. For example, if a REIN source is detected having an impulse length of five DMT symbols per IAT, but the RS-ILV scheme has the ECC to accommodate four corrupt DMT symbols per IAT, rather than constantly retransmitting one DMT symbol per IAT, IMUNE module 1012 can reconfigure the RS-ILV scheme to increase its ECC to accommodate five corrupt DMT symbols per IAT. In a typical, RS-ILV scheme, the ECC of the system is derived from the redundancy inherent in the RS code and the depth of the interleaving in the interleaver. There are some options for adjusting the ECC of the RS-ILV. First, the amount of redundancy in the RS code can be adjusted by initiating an online reconfiguration such as seamless rate adaptation (SRA) in accordance with xDSL standards. Another option is to adjust the interleaving depth which can be accomplished by using a dynamic interleaving length (or depth) change message in accordance with xDSL standards. A change in the redundancy in the RS code has less impact on latency but more impact on rate (throughput) than a change in the depth of interleaving.

While as described for FIG. 13, IMUNE module 1012 described as performing most of the logic, there are may be circumstances where the CPE 1320 is not equipped to perform these operations either due to limited resources or potentially bound by standards. In such a situation, CPE 1320 could relay the impulse noise information received from impulse noise monitoring/analysis module 1306 to CO 1350 which can determined the needed ECC and adjust the ECC of the RS-ILV by initiate the SRA or using a dynamic interleaving length (or depth) change message and it can refine the blanking information using the EOC.

Figure 14:
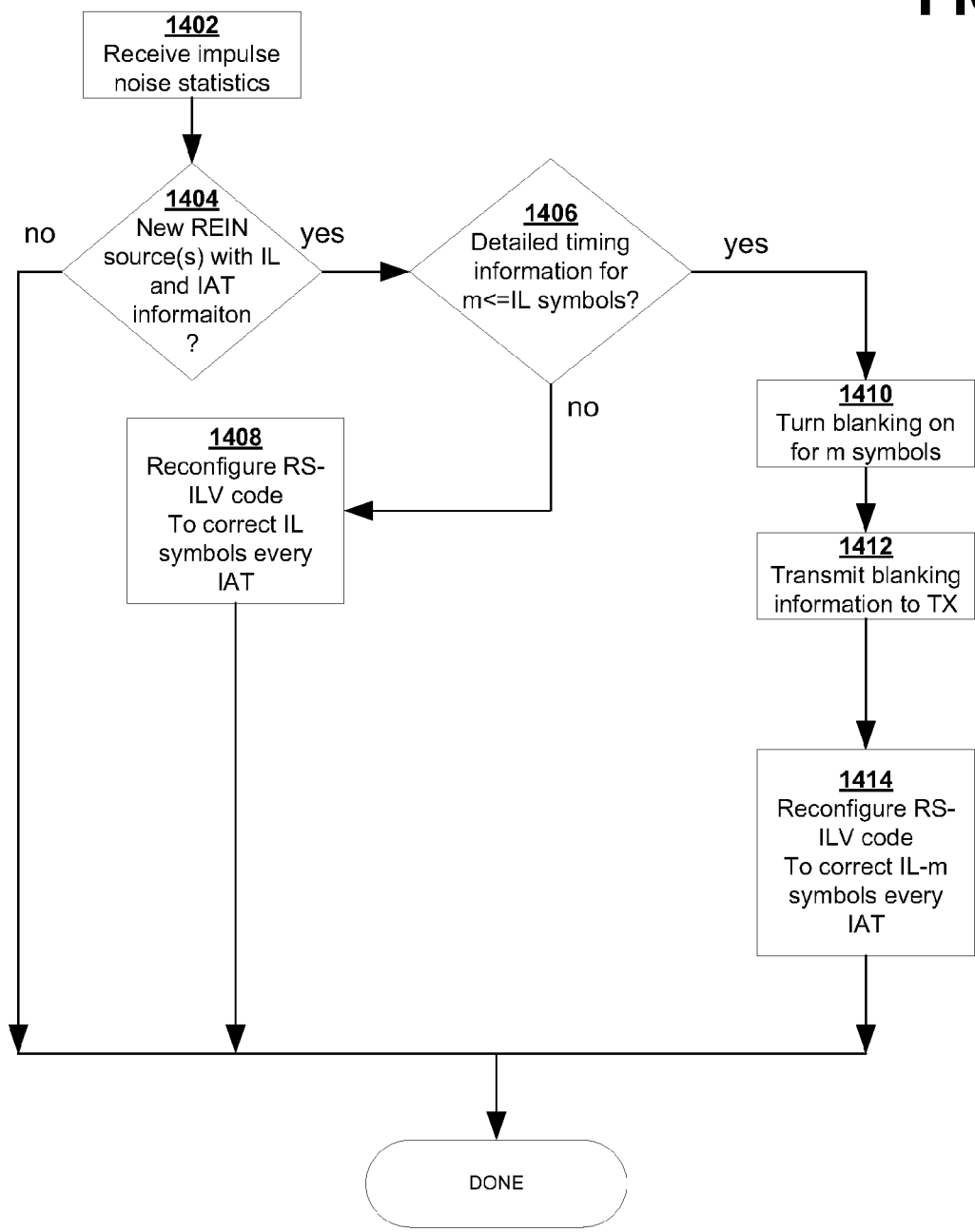
FIG. 14 illustrates the decision making of the IMUNE system for reconfiguring a transmitter and receiver.

FIG. 14 illustrates the decision making of the IMUNE system (IMUNE module 1010 and/or IMUNE module 1012) for reconfiguring CPE 1320 and CO 1350 or more generally a transmitter and receiver. At step 1402, statistics are received from impulse noise monitoring/analysis module 1306. At step 1404, if the statistics provide information about new REIN sources including the impulse length and IAT information, the IMUNE system proceeds to step 1406. If at step 1406, detailed timing is not available for any of the new REIN sources, the IMUNE system proceeds to step 1408. At step 1408, the ECC of the RS-ILV is adjusted to correct for the new REIN sources to insure that the ECC can correct for each REIN source's impulse length over an IAT period, which can be a change in the redundancy of the RS code or a change in the depth of the interleaving. If however, detailed timing information is available for some of the new REIN sources at step 1410, with m DMT symbols within the new REIN sources predictable blanking is turned on for those m DMT symbols. Additionally, the blanking information is transmitted to the transmitter at step 1412. At step 1414, similar to step 1408, the ECC of the RS-ILV is adjusted to correct for the remaining unpredictable symbols within the new REIN sources.

In addition to increasing the ECC of the RS-ILV in the presence of new REIN sources, the ECC of the RS-ILV can also be reduced in the event a previously known REIN source is no longer present. In such a case, the redundancy of the RS code or the depth of interleaving can be adjusted to reduce the ECC of the RS-ILV. It should be noted that the adjustment to the ECC can also include a margin to correct for errors not related to impulse noise such as stationary noise, e.g., crosstalk or background wire noise.

Figure 15:
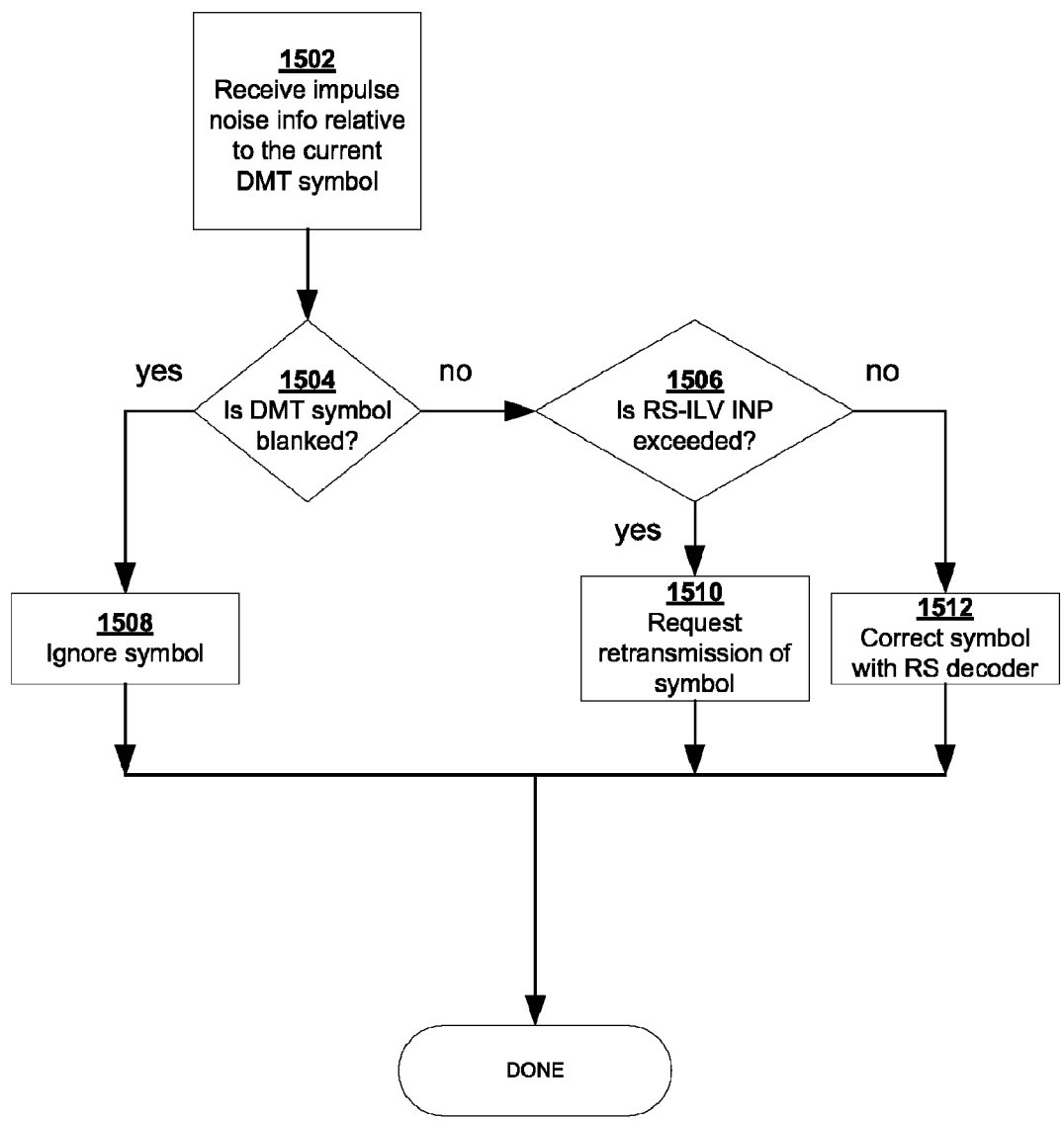
FIG. 15 illustrates the decision making of the IMUNE system real time error processing.

FIG. 15 illustrates the decision making of the IMUNE system real time error processing. At step 1502, the IMUNE system receives impulse noise information relating to the current DMT symbol. If at step 1504, the current system is determined to be blanked, the DMT symbol is ignored, that is, no processing is done at step 1508. If not, at step 1506 the IMUNE system determines whether correcting the current DMT symbol will exceed the ECC. For example, if the RS-ILV can correct 3 corrupted DMT symbols within the time IAT and the RS-ILV has already corrected 3 DMT symbols within the last IAT elapsed time, then the ECC would be exceeded. If the ECC would be exceeded, a retransmission of the DMT symbol is indicated at step 1510. If not, the IMUNE system allows the RS-ILV decoder to correct the errors contained in the corrupted DMT symbol.

Often, the use of blanking can be more efficient than with RS-ILV, however, it requires more detail of the characteristics of impulse noise on the line. In this embodiment, IMUNE modules 1010 and 1012 can adjust the amount of redundancy in the RS-ILV code, set blanking periods and request retransmissions. All three techniques have advantages and disadvantages, and IMUNE module 1010 and 1012 can apply the appropriate technique. Retransmission works best when impulse noise is very long and unpredictable such as SHINE. In addition, retransmission can also take into account the redundancy of the RS-ILV code and only retransmit enough data to allow the RS-ILV code to work. Blanking works best in the other extreme where the impulse noise is very predictable. However, there may be situations such as multiple REIN sources or even a single REIN source with significant drift where precise timing is difficult to calculate. RS-ILV is best applied when some knowledge or statistic is known about the impulse noise sources so the appropriate amount of redundancy can be applied; e.g., the impulse length and periodicity of REIN sources is known but not the particular time of the impulse is known.

A primary advantage of the system described in FIGS. 13 & 14 is that all three impulse noise protection schemes or any subset can be utilized simultaneously and cooperatively. For example, the IMUNE system may receive sufficient information to time two REIN sources, but a third REIN source cannot be timed, but is characterized as far as its impulse length. Blanking can be applied to address the two REIN sources and the third REIN source is left to the FEC. Depending on the circumstances, the redundancy in the FEC code can even be reduced, so that the benefits of blanking carry over to reducing the amount of redundancy that needs to be transmitted. Another example would be when a single REIN source corrupts n DMT symbols every REIN period but only the location of m<n corrupt DMT symbols can be accurately predicted. In such case, the m corrupt symbols whose location can be predicted can be blanked, whereas the other n−m can be corrected with a RS-ILV scheme configured to correct n−m corrupt symbols.

It should also be noted that any of the three methods can also be deliberately turned off. For example, if the impulse noise information is very good, the redundancy in the FEC can purposely be set very small if not zero. A small amount of redundancy might be used to correct for errors not related to impulse noise such as stationary noise, e.g., crosstalk or background wire noise. In such circumstances, blanking works cooperatively with retransmission, so essentially blanking is relied upon for all predictable impulse noise sources and retransmission for all unpredictable impulse noise sources.

Because initially nothing is known about noise sources on a DSL loop, it is recommended that initially the ECC of the RS-ILV be set initially high, so that all impulse noise sources present such as REIN sources or SHINE can be anticipated by the RS-ILV. As the impulse noise monitoring and analysis module is better able to characterize the REIN sources on the line, blanking can be used to account for some REIN sources reducing the ECC requirement of the RS-ILV. Furthermore, even if the statistics about the REIN sources are not sufficient to permit blanking for all REIN sources, the ECC can be better tuned as better knowledge about REIN sources become known. Furthermore, the ECC can incorporate a margin to account for other noise sources which also can be refined as more information about those noise sources becomes available.

It should be emphasized that the above-described embodiments are merely examples of possible implementations. For example, while the above-described embodiments are directed towards addressing the effect of impulse noise on CO to CPE transmissions, the principles disclosed here could equally apply to CPE to CO transmission. Many variations and modifications may be made to the above-described embodiments without departing from the principles of the present disclosure. All such modifications and variations are intended to be included herein within the scope of this disclosure and protected by the following claims.

What is claimed is:

1. A method of communication comprising:
    encoding, by a forward error correction (FEC) encoder, first data into a first transmission packet, the FEC encoder having error correction capability (ECC);
    storing the first data into a retransmission memory;
    receiving retransmission information relating to a second transmission packet from a receiver;
    analyzing the retransmission information;
    determining whether a retransmission of the second transmission packet comprising encoded second data is required based on the retransmission information and the ECC; and
    if a retransmission is required, retransmitting the second transmission packet, wherein the retransmitted second transmission packet is a Discrete Multi-tone (DMT) symbol.

2. The method of claim 1, wherein retransmission information comprises received status information for each transmission packet.

3. The method of claim 1, further comprising:
    receiving impulse noise information relating to a receiver from an impulse noise monitoring/analysis module;
    determining whether there is a change in repetitive electrical impulse noise (REIN) sources based on the impulse noise information and whether the impulse noise information includes impulse length and inter-arrival time (IAT) information; and
    in response to determining whether there is a change,
    determining whether there is any detailed timing information in the impulse noise information for the change in REIN sources;
    adjusting blanking timing information based on the detailed timing information and transmitting the blanking information to the receiver, if detailed timing information is in the impulse noise information; and
    determining a required ECC is based on the change in REIN sources not accounted for by the blanking timing information, adjusting the FEC encoder and an FEC decoder in the receiver if the ECC is less than the required ECC.

4. The method of claim 3, wherein the FEC encoder is a Reed Solomon encoder and interleaver and the FEC decoder is a Reed Solomon decoder and de-interleaver, wherein the ECC is based on a Reed Solomon redundancy and/or an interleaving depth wherein adjusting the FEC encoder and the FEC decoder comprises:
    changing the redundancy by initiating a seamless rate adjustment; and/or
    changing the interleaving depth by using an interleaving depth change message.

5. A transmitter comprising:
    a forward error correction (FEC) encoder having error correction capability (ECC);
    a retransmission memory;
    a processor; and
    a program memory comprising instructions,
    said instructions causing the processor to:
        instruct the FEC to encode first data into a first transmission packet;
        store the first data into the retransmission memory;
        receive retransmission information relating to a second transmission packet from a receiver;
        analyze the retransmission information;
        determine whether a retransmission of the second transmission packet is required based on the retransmission information and the ECC; and
        retransmit the second transmission packet if a retransmission is required, wherein the retransmitted second transmission packet is a Discrete Multi-tone (DMT) symbol.

6. The transmitter of claim 5, wherein retransmission information comprises received status information for each transmission packet.

7. The transmitter of claim 6, wherein the status information has a received time and each transmission packet retransmitted is determined based on a predetermined time offset from the received time.

8. The transmitter of claim 5, wherein the instructions further cause the processor to:
    receive impulse noise information relating to a receiver from an impulse noise monitoring/analysis module;
    determine whether there is a change in REIN sources based on the impulse noise information and whether the impulse noise information includes impulse length and IAT information; and
    in response to determining whether there is a change,
    determine whether there is any detailed timing information in the impulse noise information for the change in REIN sources;
    adjust blanking timing information based on the detailed timing information and transmitting the blanking information to the receiver, if detailed timing information is in the impulse noise information; and
    determine a required ECC is based on the change in REIN sources not accounted for by the blanking timing information, and adjust the FEC encoder and an FEC decoder in the receiver if the ECC is less than the required ECC.

9. The transmitter of claim 8, wherein determining the required ECC is further based on a margin to account for errors not caused by impulse noise.

10. The transmitter of claim 9, wherein the ECC is adjusted to the margin.

11. The transmitter of claim 8, wherein the FEC encoder is a Reed Solomon encoder and interleaver and the FEC decoder is a Reed Solomon decoder and de-interleaver, wherein the ECC is based on a Reed Solomon redundancy and/or an interleaving depth wherein adjusting the FEC encoder and the FEC decoder comprises:
    changing the redundancy by initiating a seamless rate adjustment; and/or
    changing the interleaving depth by using an interleaving depth change message.

* * * * *